May 11, 1937.　　　　　G. BELL　　　　　2,079,674
MACHINE FOR RECORDING TEXTILE CONSTRUCTIONS OR DESIGNS

Filed Dec. 21, 1933　　　7 Sheets-Sheet 1

Fig. 1.

INVENTOR
Gilbert Bell
BY
Pennington and White
ATTORNEYS.

Fig. 2.

May 11, 1937.    G. BELL    2,079,674
MACHINE FOR RECORDING TEXTILE CONSTRUCTIONS OR DESIGNS
Filed Dec. 21, 1933    7 Sheets-Sheet 3

INVENTOR
Gilbert Bell
BY
Pennington and White
ATTORNEYS

May 11, 1937. G. BELL 2,079,674
MACHINE FOR RECORDING TEXTILE CONSTRUCTIONS OR DESIGNS
Filed Dec. 21, 1933 7 Sheets-Sheet 5

INVENTOR
Gilbret Bell
BY
ATTORNEYS

May 11, 1937.  G. BELL  2,079,674
MACHINE FOR RECORDING TEXTILE CONSTRUCTIONS OR DESIGNS
Filed Dec. 21, 1933   7 Sheets-Sheet 7

Patented May 11, 1937

2,079,674

UNITED STATES PATENT OFFICE 2,079,674

MACHINE FOR RECORDING TEXTILE CONSTRUCTIONS OR DESIGNS

Gilbert Bell, Lonsdale, R. I.

Application December 21, 1933, Serial No. 703,398

6 Claims. (Cl. 197—1)

This invention relates to an apparatus for recording the construction or design of woven fabrics. Such designs or "constructions" are recorded on cross-ruled paper by filling in certain squares with color, usually black. The squares or quadrates are treated successively in horizontal rows, each row representing one course or throw of the filling across the fabric. The purpose of the record or design is to designate specifically those warp ends over and under which the filling threads pass. The fact that a rectangle or quadrate is uncolored or blank denotes that the filling has passed under the warp end or ends, as may be indicated by a succession of uncolored spaces.

Original designs of "construction" and copies of designs are recorded manually in the same fashion, on cross-ruled paper. Frequently, the "construction" of a woven fabric must be determined and recorded, the analysis being made under a pick-glass and the filling and warp ends separated pick by pick. Concentrated scrutiny and the use of both hands for holding the pick-glass and manipulating the weave-dissecting implement are essential to accuracy. Two workers are usually required to perform the above operations, the first or analyst to dissect the weave and announce his determinations or findings and the second to record manually upon cross-ruled paper the determination announced.

The principal object of this invention is to provide an instrumentality whereby one person, alone, may readily analyze cloth construction and record the results of that analysis with greater accuracy and speed than is possible for two persons to so do.

Other objects are to obviate the necessity of using cross-ruled paper and yet produce the cross-ruled effect; to provide in the apparatus two conventional sizes of printing characters and selective feeds therefor, so that different size characters may be printed according to the requirements; and to provide a feeding device that will feed the paper either upwardly or downwardly so that the design record may be started either at the top or bottom of the sheet with equal success.

Further objects of the improvement are set forth in the following specification which describes several preferred embodiments of the invention, by way of example, as illustrated by the accompanying drawings. In the drawings:

Referring first to Figs. 1 to 18, inclusive, which show a preferred construction of the apparatus, the paper or other material on which the weave construction is recorded is preferably supplied in a roll 2. The roll 2 is supported on a carriage 3 slidably mounted in a casing 10 and propelled in one direction by a motor 4 through means of a band 8 connecting said motor and carriage. The motor 4 may be of a spring type or any other suitable propelling device may be employed. The web 5 of the roll which constitutes the blank for receiving the printed record is passed under a printing roll or platen 6 to which it is held by a usual type of pressure rollers 7 so that rotation of the platen 6 feeds the web 5.

As detailed in the preamble, the conventional cloth construction design is a mat of closely annexed rectangular areas or quadrates, some solidly colored and some blank. The conventional and accepted sizes of quadrates to which design paper is ruled are one-eighth and one-sixteenth inches square. The present device is adapted to print either size of squares and consequently the ratchet-wheels 97 and 98 which feed the platen 6 have their teeth so spaced relative to the circumference of said platen as to feed the paper one-sixteenth inch per tooth or one-eighth inch for every two teeth of feed. Likewise, the escapement-mechanism which releases the carriage 3 to the action of the motor 4 is so contrived as to feed the carriage 3 either one-sixteenth or one-eighth inch as required. The ratchet- and escapement-mechanisms will be described in detail later.

The casing 10 of the apparatus carries a cross-girt 11 upon which are mounted the ribbon spools 12 and 13 and two recording members, namely, an imprint-member 14 and a space-member 15. The ribbon-feeding mechanism may be of any known type and is, therefore, not herein shown in detail. The members 14 and 15 are mounted on a vertical plate or slide 16 which is slidable in guideway 17 of the girt 11. The movement of the slide 16 is also controlled by a guide-pin 18 which is set in a step 19 at the bottom of a pendant portion 20 of the cross-girt 11. A spring 21 acting upon a collar 22 on the top of said pin presses upon a step 23 of the slide 16 to normally hold it down against the step 19 at the bottom station of its up and down movement, the step 23 being movable on and guided by the pin 18. A key-lever 24 is connected with the slide 16 by a pin 25 held in lugs 26 of the slide 16. The key-lever 24 is mounted on a fulcrum-pin 27 projecting from a stand 28 riveted to the bottom of the casing 10. The key-lever 24 projects outwardly through an opening in the front of the casing 10 and terminates in a finger-piece or key 31 which may be depressed to raise the slide 16 to its upper station, a detent-lever 32 serving to releasably lock the key-lever 24 in this position.

Figure 5:
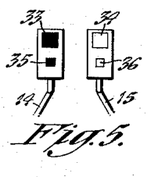
Figs. 5, 6 and 7 are detail views of different forms of typing or recording characters employed in the apparatus.
Figure 6:
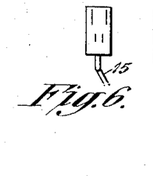
Figure 7:
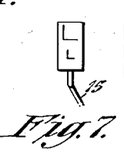

As shown in Fig. 5 each of the two recording members 14 and 15 has mounted at its extremity or head two stamps, all four stamps being identical in outer form. The upper stamps 33 and 34 are one-eighth inch square and the lower stamps 35 and 36 are one-sixteenth inch square. The stamps 33 and 35 of the recording member 14 constitute the pattern characters and are provided with substantially flat faces to effect a rectangular imprint of solid color. In the case of an area as large as one-eighth inch square a solid face sometimes causes the ink to spread so that the imprint is not maintained in rectangular form but tends to bulge between the corners and it is found desirable to relieve the pressure by very slightly concaving the face or by otherwise treating it.

Figure 8:
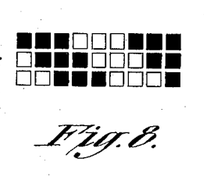
Figs. 8, 9 and 10 show portions of the records produced with the characters illustrated in Figs. 5, 6 and 7, respectively.
Figure 9:
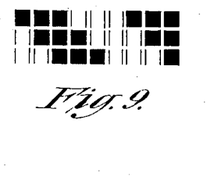
Figure 10:
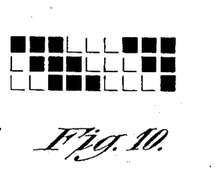

The stamps 34 and 36 of the recording member 15 are formed as rectangular outlines or delineations which denote space or absence of any pattern character, hence, the designation of the member 15 as a space member. As explained above, cloth construction design is preponderantly a one character design. The distribution of quadrates of solid color through a mat or area forming the design denote by their relation to characterless or space rectangles the relation of warp and filling in the cloth. As the imprints of the stamps 34 and 36 simply serve to set off open or blank spaces they are preferably of box-like outline so that the resultant pattern recorded by the apparatus is a composite of filled and open rectangles as shown in Fig. 8. The resultant graph is identical with that previously produced on cross-ruled paper. The pattern character substantially fills its area when imprinted but may be slightly smaller than said area. Through this provision when a group of the full face quadrates have been printed the individual characters are separated one from another by white spaces, and in the same manner the blank quadrates are bounded by black lines, see Fig. 8. The individual imprints or characters are thus distinguishable and readily counted. Inasmuch as cloth construction is analyzed pick by pick and each horizontal line of rectangles in the pattern represents one pick, spacing members 15 of the types shown in Figs. 6 and 7 may be employed. With the use of the member 15 shown in Fig. 6 the spaces between the printed squares will be defined or bounded by two vertical lines and with the form of member illustrated in Fig. 7 they will be bounded by vertical and horizontal lines.

The recording members 14 and 15 are fulcrumed on pins 37 and 38 carried in lugs 39 and 40 of the slide 16 and are swung on these pins to impel the character- and space-denoting stamps to cause them to strike the web 5 of the roll 2. The ink-ribbon 41 carried by the spools 12 and 13 passes through a usual form of ribbon-guide 9 between the web 5 and the imprinting characters or stamps. When the stamps strike against the ribbon and web the forms of the stamps are impressed upon the web.

The recording members 14 and 15 are operated by two magnets 42 and 43 preferably of the solenoid type which are mounted on the bottom of the casing 10. The magnets are connected by a circuit wire 171, shown in Fig. 11, with the secondary winding 172 of a transformer 173 mounted in a box-like casing 174 attached to the rearward side of the main casing 10. The other secondary circuit wire 175 of the transformer is grounded in the casing 174 at 176, see Figs. 2 and 11. The primary side 177 of the transformer is connected through means of a suitable fitting and conductor 47 with any available lamp- or wall-socket indicated at 46 in Fig. 1. The plunger of each solenoid is connected with its recording member 14 or 15, as the case may be, by means of a coiled spring-link 48. Inasmuch as the arrangement and action of both solenoids and of the recording members operated by them are identical the description will be herein confined to one set. One end of the link 48 is hooked around a pin 50 carried by the solenoid plunger 49, while its opposite end is hooked through a hole in a lug 51 of the recording member 15. When the circuit is closed and the solenoid is energized, the recording member is impelled or projected against the ribbon 41 and the character of the recording member is imprinted on the record blank or web 5. The spring form of the link 48 is employed for two reasons, first, through its use an elastic blow of the recording member is effected and second, in the event of employing alternating current the spring structure permits close sealing between the plug and the plunger of the solenoid to effect a positive solenoid action.

Figure 4:
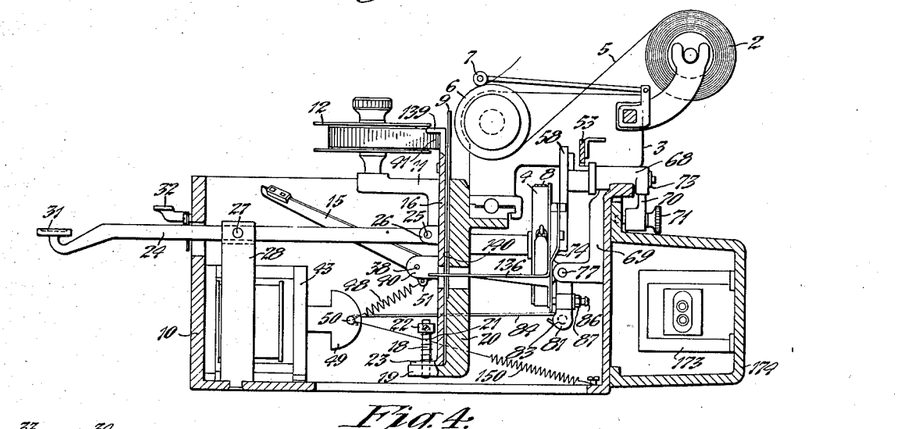
Fig. 4 is a cross-sectional view through the apparatus taken on line 4—4 of Fig. 2.
Figure 12:
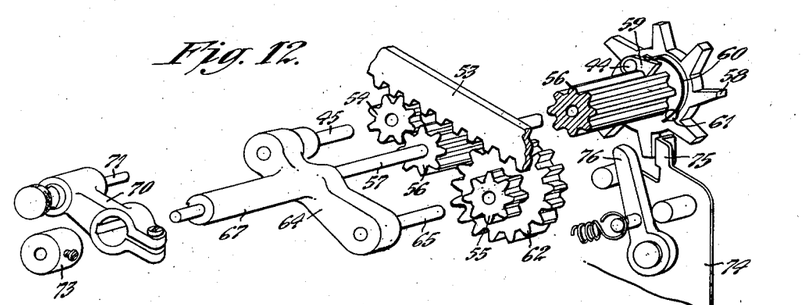
Fig. 12 is a composite perspective view of the several parts of the escapement-mechanism.
Figure 13:
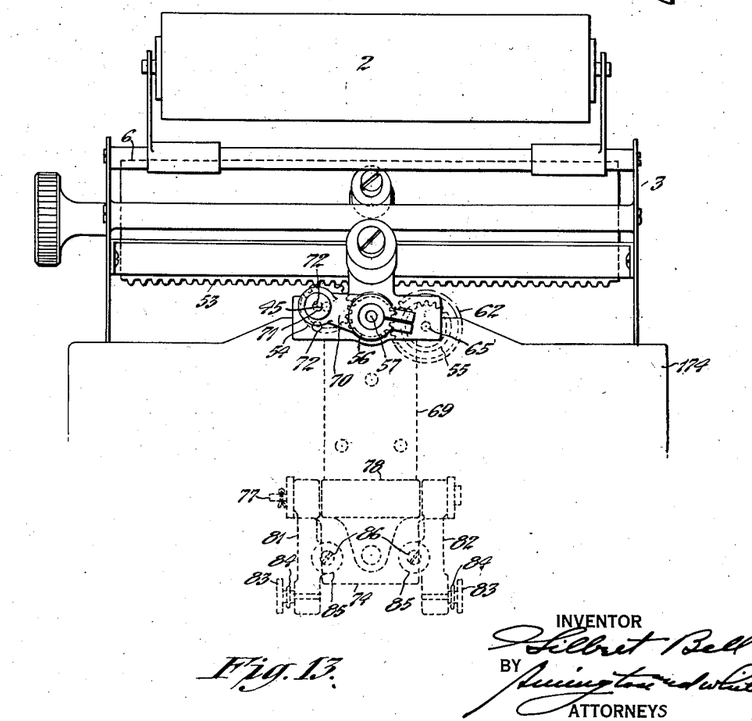
Fig. 13 is an enlarged partial rear elevation of the recording apparatus.

The feeding of the carriage 3 is effected and regulated by a duplex escapement shown in Figs. 4 and 12. Mounted on the bottom of the carriage 3 is a feed-rack 53 and adapted to alternatively engage therewith are two gears 54 and 55. The teeth of the rack and gears 54 and 55 have the same circumferential pitch, for example one-eighth inch. The gear 54 meshes with a gear 56 free on a spindle 57 and arranged adjacent the escapement-wheel 58 to be driven thereby through means of a pawl 59. The pawl 59 is pivotally mounted on a stud 44 fast in the side of the escapement-wheel 58 and held in yielding engagement with the teeth of the gear 56 by a spring 60. The spring 60 is held in the slotted end of a stud 61 also mounted on the escapement-wheel 58. Secured to the gear 55 is a gear 62 which is twice the diameter of the gear 56 and having twice the number of teeth. In the arrangement described the gears 54, 55 and 56, together with the escapement-wheel 58, all have eight teeth while the gear 62 has sixteen teeth. When the gear 54 is in mesh with the rack 53, the latter will move one-eighth inch with the release of each tooth of the escapement-wheel 58. When, on the other hand, the gear 55 is enmeshed with the rack 53 the latter will be moved only one-sixteenth of an inch with the release of each tooth of the escapement-wheel. The gear 54 is mounted on a stud 45 at one extremity of a rocker-arm 64, while the conjoined gears 55 and 62 are mounted on a similar stud 65 at the opposite extremity of the rocker-arm. The arm 64 has a hub 67 which rocks in a bearing 68 of a bracket 69 fastened to the casing 10, see Fig. 4. The hub carries at its outer end an arm 70, in which is mounted a spring-actuated locking pin 71 by means of which the rocker 64 is held in either of two holes 72 to cause one or the other of the gears 54 and 55 to mesh with the rack 53. Fig. 13 shows the rocker 64 swung into position to cause the pin 71 to enter the top hole 72 in the bracket 69 to maintain the gear 54 in mesh with the rack 53. To change the setting to enmesh the gear 55 with the rack the pin 71 is removed and entered into the lower hole 72. The spindle 57, previously mentioned, is journaled in the hub 67 of the arm 64 and held against axial movement therein by a collar 73.

The escapement-mechanism is of a usual form comprising a rockable frame 74 having a fixed detent 75 and carrying a movable detent 76 which engages the tooth of the escapement-wheel next behind that held by the fixed detent. The frame 74 is carried on a pin 77 extending through a boss 78 at the bottom of the bracket 69. Pivoted on the pin 77 are two arms 81 and 82, each carrying a headed pin 83. Connecting the pin 83 with the pin 50 of the solenoid plunger 49 is a wire link 84. On the sides of the arms 81 and 82 are projections 85 which overhang the escapement-frame 74 and passing through threaded holes in the projections are screws 86 having checknuts 87. The ends of the screws are adapted to bear against the escapement-frame 74 to rock the latter when the solenoids 42 or 43 are energized to draw the arms 81 or 82 forwardly. The screws 86 may be readily adjusted to provide for a close setting or adjustment of the escapement-mechanism.

It is frequently necessary to record cloth designs starting from the bottom and working upwardly along the web 5. This necessitates the provision of means for feeding the record blank either upwardly or downwardly as the printing proceeds. For this purpose the present invention makes use of the ratchet-roll feed-mechanism shown in detail in Figs. 3, 14 and 15. Attached to the left-hand end of the carriage 3 is a bracket 88 having a vertical bearing 89. Within this bearing 89 is rotatably mounted a spindle 90 carrying at its lower end a spiral gear 91 which meshes with a spiral gear 92 secured to the shaft or spindle 93 upon which the roll 6 is mounted. Secured to the vertical spindle 90 and abutting the top of the bearing 89 is a check ratchet-wheel 94. A check-pawl or dog 95 constructed from spring metal is attached to the bracket 88 by screws 96 and engages the teeth of the check ratchet-wheel 94 to prevent retrogressive movement thereof. The notches in the check ratchet-wheel correspond to the smallest quadrate to be printed, in the present case one-sixteenth of an inch.

Figure 14:
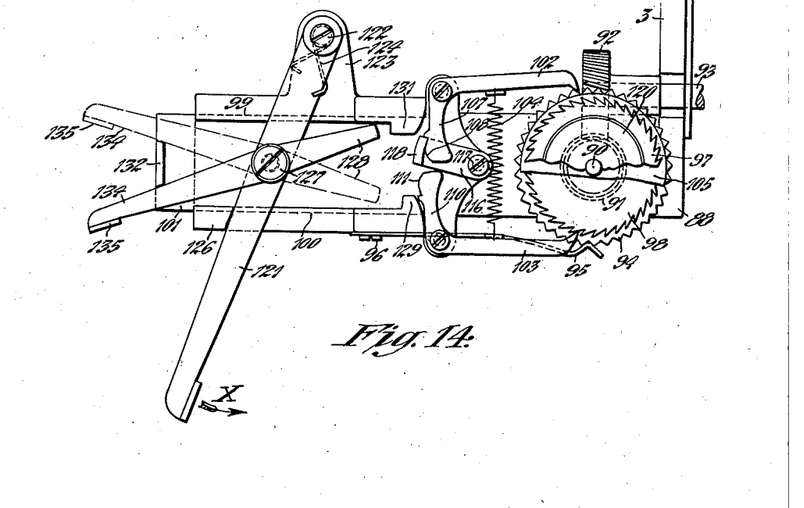
Fig. 14 is a plan view of the paper-feeding mechanism.
Figure 15:
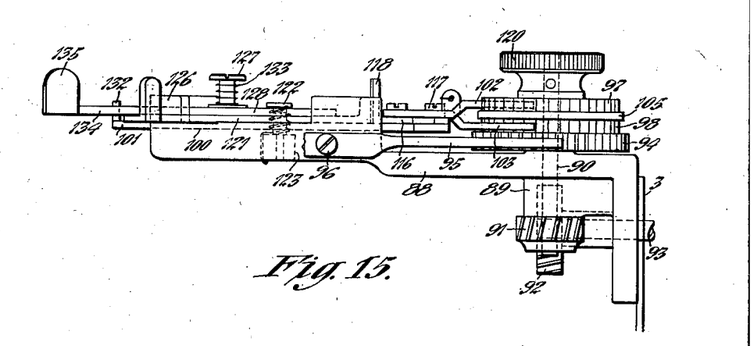
Fig. 15 is a front elevation of the mechanism illustrated in Fig. 14.

Above the check ratchet-wheel 94 the spindle 90 carries two feed ratchet-wheels 97 and 98 having oppositely cut teeth. Formed in the bracket 88 are opposite guideways 99 and 100 in which is mounted a movable slide 101, the guideways and the slide being at substantially the same level as the feed ratchet-wheels 97 and 98. Pivotally mounted on the slide 101 are two feed-pawls 102 and 103 for actuating the ratchet-wheels 97 and 98, respectively. A coil spring 104 attached to both pawls serves to engage their pointed ends with the respective wheels. A disk 105 interposed between the two ratchet-wheels 97 and 98 serves to prevent either pawl from encountering the wrong ratchet-wheel. The pawls 102 and 103 are provided with arms 107 and 110 having cam-faces 108 and 111. Pivoted on a stud 117 on the slide 101 is a rockable dog 116. The outer end of the dog 116 is bent upwardly to form a detent 118 which also serves as a handle for rocking or shifting the position of the dog. The detent portion 118 is formed to encounter the cam-formation 108 of the arm 107 of the pawl 102 and force the latter out of engagement with its ratchet-wheel 97 in the manner as illustrated in Fig. 14, thereby leaving the feed-pawl 103 free to engage the feed ratchet-wheel 98. In other instances the dog may be rocked to encounter the cam-face 111 to withhold the pawl 103 from engagement with the ratchet-wheel 98 whereby to leave the pawl 102 free to engage with and operate the ratchet-wheel 97. The dog 116 may be swung to a neutral position to engage both arms 107 and 110 to force both pawls out of engagement with their respective ratchet-wheels. With the last described adjustment the vertical spindle 90 is free to be rotated in either direction to cause the roll or platen 6 to be similarly rotated. For the purpose of facilitating the turning of the spindle 90 a knob 120 is secured to the top of the spindle.

Movement of the slide 101 to index the roll or platen 6 is accomplished by means of a lever 121 pivotally mounted on a stud 122 secured in a projection 123 of the bracket 88. A spring 124 coiled about the stud 122 with its ends engaging the lever 121 and projection 123 maintains the slide 101 in normal position with the lever 121 bearing against a portion 126 of the bracket 88. The lever 121 is connected with the slide 101 by means of a stud 127 which also carries a stop-dog 128. The dog 128 determines the extent of movement of the slide 101 and therefore the extent of rotational feed of the roll or platen 6. The portion 126 of the bracket 88 is formed with opposite shoulders 129 and 131, against which the end of the stop-dog strikes to limit the movement of the slide 101. As shown in Fig. 14 the shoulder 131 is arranged nearest the end of the dog 128 when the latter is in its inoperative position. Through this provision the extent of rotative movement of the ratchet-wheels 97 and 98 as effected by the pawls may be adjusted to obtain either a one-sixteenth or one-eighth inch feed. The extremity of the slide 101 is upturned to form an abutment 132 for holding the stop-dog 128 to either feed adjustment. The stop-dog 128 is normally held downward by a coil spring 133 surrounding the stud 127 but is yieldable to permit the stop-dog arm 134 to be manually raised and moved beyond either side of the abutment 132, see Fig. 14. The end of the stop-dog arm 134 is extended in a handle 135 for facilitating the angular adjustment thereof.

The driven gear 92 on the roll spindle 93 is larger than the gear 91 on the vertical spindle 90 to cause a reduction in the rate of movement thereof. A tooth space as small as one-sixteenth inch is not practical for ratchets of the type herein shown and wear and back lash will cause improper functioning when fine graduations are used. Through the gear reduction above outlined it is possible to construct the ratchet-wheels with relatively large teeth.

The carriage 3 having been fed through its prescribed extent of movement by the motor 4 is returned to start a new row of imprints by pushing the handle-lever 121 in the direction indicated by the arrow X in Fig. 14. If the feed-pawl 102 is operative, the blank 5 will be fed upwardly; and if the pawl 103 is operative, the blank will be fed downwardly. When the stop-dog 128 is arranged to encounter the shoulder 131 the blank 5 will be fed one-sixteenth of an inch. If, on the other hand, the stop-dog 128 is arranged to encounter the stop-shoulder 129 the blank will be fed one-eighth of an inch. Through this selective feeding means the pattern may be printed with one-sixteenth or one-eighth inch quadrates.

Projecting forwardly from the escapement-frame 74 is an arm 136, see Fig. 4, which enters the bottom of the ribbon-guide 9 and serves to raise said guide to interpose the ribbon 41 between the recording member 14 or 15 and the record blank 5 to transfer the imprint of the stamp of the recording member to the blank. The ribbon-guide is of usual form having inwardly turned ears 137 that embrace the edges of a standard 138 forming a part of the vertical slide 16. The slide 16 carries at its upper end a guide 139 for directing the head or imprinting portion of each recording member to the web 5 being printed. The lower portion of the ribbon-guide 9 with which the arm 136 engages extends downward in a guideway 140 formed in the girt 11 behind the slide 16.

Figure 1:
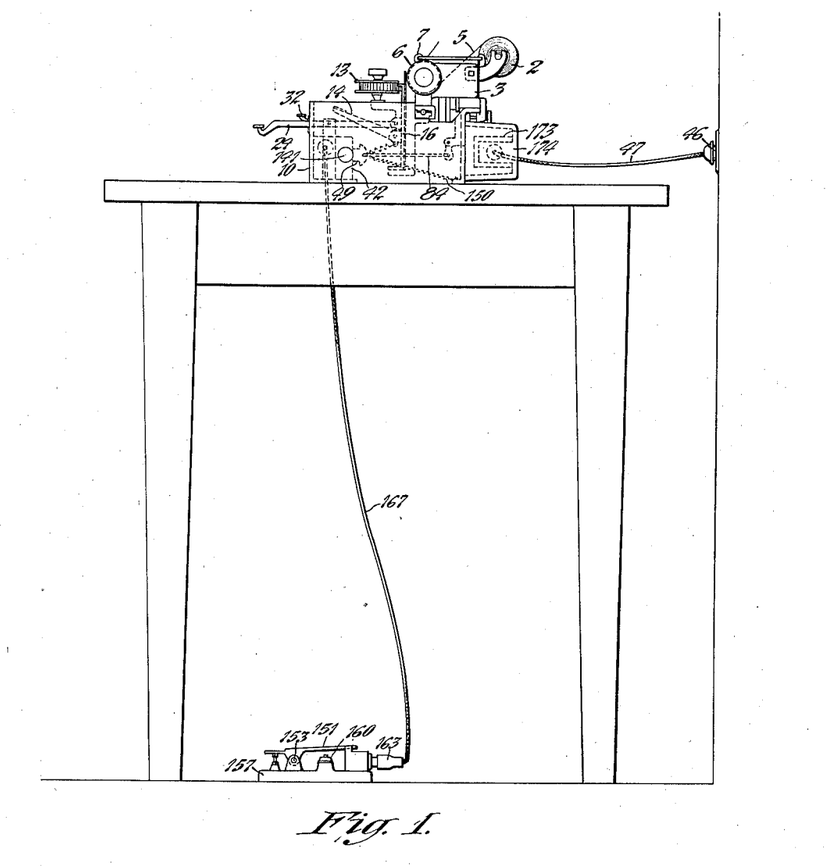
Fig. 1 is a general view of the improved recording apparatus shown as mounted upon a table and illustrating its connection with the pedal for controlling the printing operation.
Figure 2:
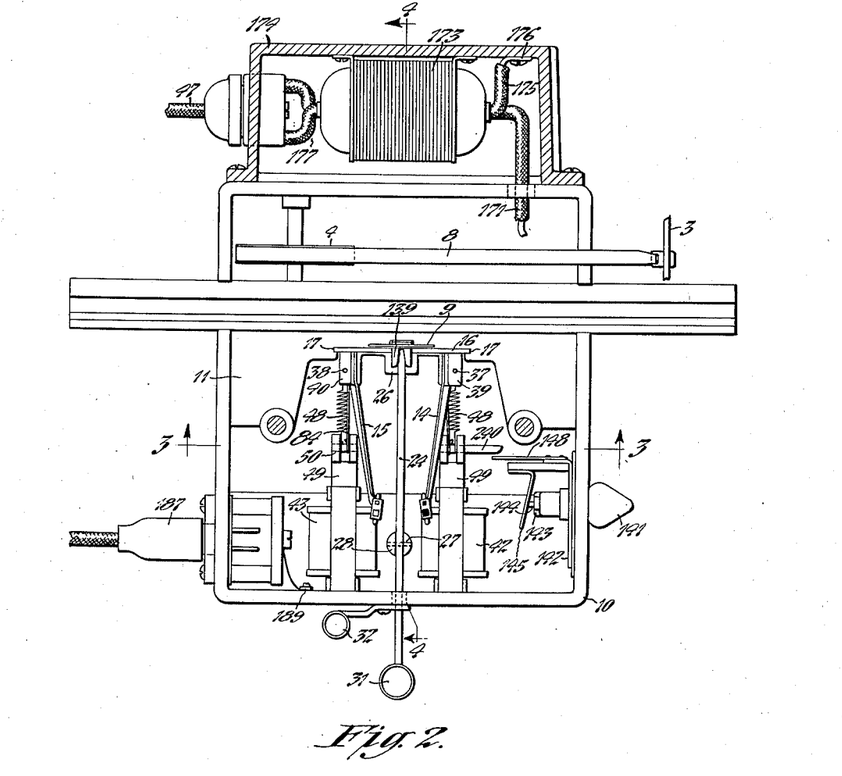
Fig. 2 is a plan view of the apparatus with the rearward end of the casing partly broken away to illustrate the interior parts.
Figure 3:
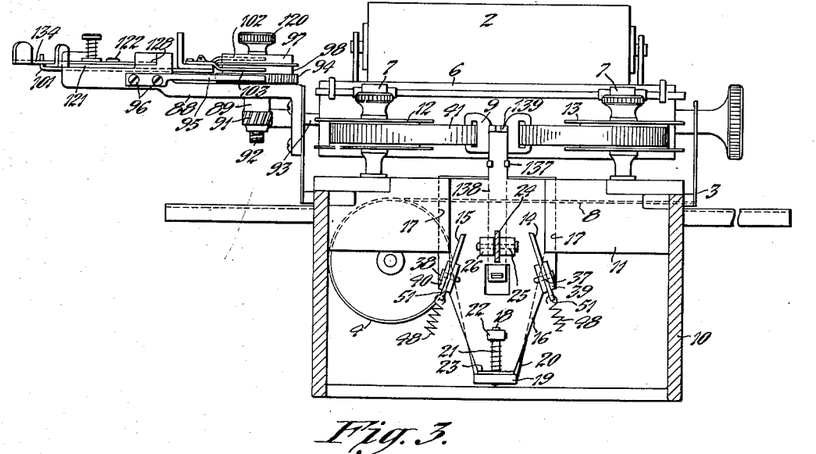
Fig. 3 is a front elevation of the same, shown partly in section on line 3—3 of Fig. 2.

Mounted on one side of the casing 10 and suitably insulated therefrom is a frame 142, see Fig. 2, which carries a socket for receiving a signal-lamp 141. The socket is provided with an insulated plug 143 through which a spring-pressed pin 144 projects into the interior of the socket to contact with the lamp-base when the latter is screwed into the socket. The spring 145 for urging the pin 144 inwardly is connected by a wire 147 with the circuit wire 171. Another spring 148 attached to the lamp-socket frame 142 extends into the path of a pin 240 of the plunger 49 of the solenoid 42. As has been described, one side of the transformer secondary is grounded in the casing 174 at 176. Hence, when the solenoid 42 is energized and retracts its plunger against the action of a coil spring 150, the pin 240 encounters the spring 148, grounding the lamp circuit, and the lamp 141 lights. As the solenoid 42 operates the recording member 14 carrying the pattern character the operator is immediately informed whether or not the correct circuit has been closed and the pattern character properly imprinted.

The circuit may be closed either by a pedal control when a sample of fabric is being analyzed, or by a finger-operated controlling means when original designs are to be copied. The finger and pedal controls are somewhat similar in arrangement but the pedal control will be herein described more in detail as it is the more important of the two.

Figure 16:
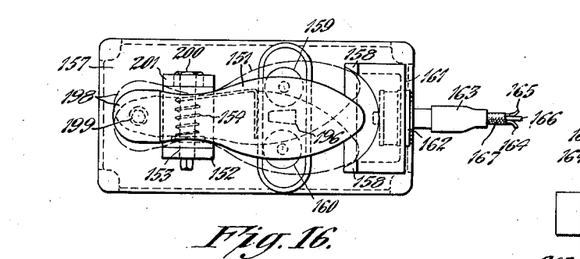
Fig. 16 is a plan view of a pedal for controlling the operation of the printing mechanism.
Figure 17:
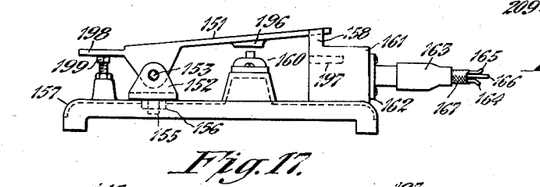
Fig. 17 is an elevation of the same.

Referring to Figs. 16 and 17, the pedal control comprises a pedal 151 pivotally mounted on a pin 153 in a yoke 152 rising from a base 157 resting upon the floor. A spring 154 coiled about the pin 153 acts to maintain the toe of the pedal 151 elevated. The yoke 152 has a vertical spindle or trunnion 155 which turns in a bearing 156 of the base 157 whereby to permit the pedal to be swung horizontally. Lugs 158 on the base 157 serve to limit the horizontal swinging of the pedal. Mounted on the base beneath the pedal are two push-button switches 159 and 160. Attached to a wall 161 at the end of the base 157 is a three-way connection 162 for receiving the plug 163 in which the three conductors 164, 165 and 166 of a cable 167 terminate. The plug 163 has one flat terminal 168 and two round terminals 169 and 170, see Fig. 11, which insures that the push-buttons 159 and 160 will be connected with the proper solenoids 42 and 43.

Figures 11, 18:
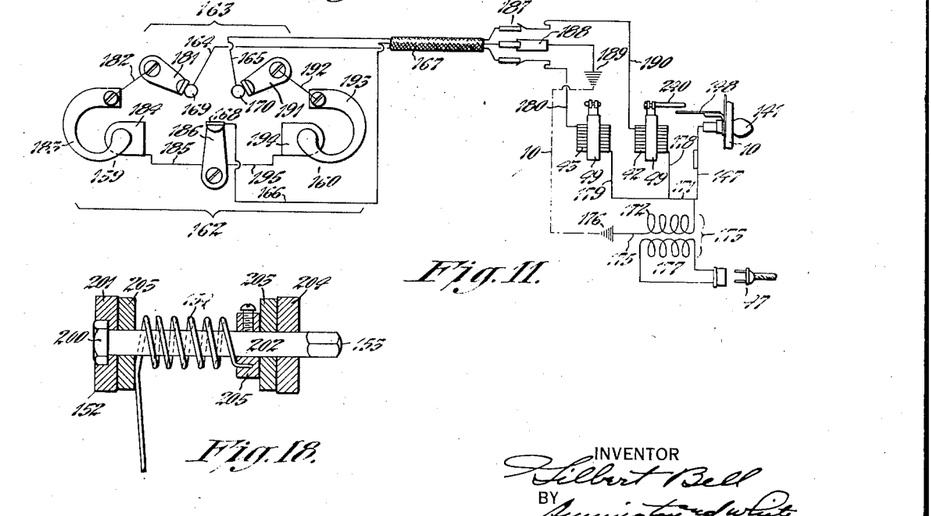
Fig. 11 is a diagram showing the electrical connections of the apparatus.
Fig. 18 is a detail of the spring-tension control for the pedal.

The electrical connections above outlined are clearly shown in the diagram of Fig. 11. The circuit wire 171 connects the secondary winding 172 of the transformer 173 with the leads 178 and 179 of the solenoids 42 and 43. The opposite lead 180 of the solenoid 43 is connected through means not herein detailed with the conductor 164 of the cable 167; the conductor 164 terminating in the round terminal 169 of the three-way plug 163. The terminal 169 is connected through a contact-spring 181 of the three-way connector 162 and wire 182 with the contact-spring 183 of the push-button 159. The plate 184 of the push-button switch 159 is connected by a wire 185 with the contact-spring 186 of the three-way connection 162. The flat terminal 168 of the plug 163 contacts with the spring 186 and is attached to the wire 166 of the cable 167. The cable 167 is connected with the circuit wiring within the casing 10 by means of a three-way fitting 187. The plate 188 of this fitting which receives the terminal of the conductor 166 is grounded in the casing 10 at 189 by any usual means.

The solenoid 42 is connected with the push-button switch 160 in a like manner. The lead 190 of the solenoid is connected to the cable conductor 165 which terminates in the round terminal 170 of the plug 163. The contact-spring 191 of the three-way connection 162 which engages the terminal 170 is connected by a wire 192 with the contact-spring 193 of the push-button switch 160. The contact-plate 194 of the push-button switch 160 is connected with the contact-spring 186 of the three-way fitting 162 by a wire 195. The wires 185, 195 and 166, together with the intervening connections constitute the return circuit of the system. When the operator swings the pedal 151 to the right and presses downwardly the projection 196 on the under side thereof depresses the push-button of the switch 160 and brings the spring 193 into contact with the plate 194. The closing of the circuit energizes the solenoid 42, causing the recording member 14 to be actuated, the light 141 to be lighted, and the carriage 3 to be shifted to receive the next imprint. By swinging the pedal to the left the projection 196 is brought over the push-button 159. Downward pressure upon the button closes the circuit for the solenoid 43 to energize the latter and cause it to operate the space-member 15 to record a blank and feed the carriage 3 to present another surface for receiving the next printing character.

A stop-ledge or projection 197 formed on the base 157 limits the downward movement of the pedal 151 so that undue pressure will not be brought to bear upon the push-buttons. Under the heel 198 of the pedal is an adjustable stop 199 for limiting the upward movement of the pedal under the action of the spring 154. Means are herein provided for varying the resistance of the spring 154 to suit the operator. Referring to Fig. 18, the pivot-pin 153 has a polygonal head 200 which fits a socket of corresponding form in one side or arm 201 of the yoke 152. The circular shank 202 of the pin 153 passes through circular holes in lugs 203 on the under side of the pedal and through the opposite arm 204 of the yoke. Fast on the pin 153 between the lugs 203 of the pedal is a collar 205 having a hole in its side for receiving one end of the spring 154. The spring 154 is coiled about the shank 202 of the pin 153 with its opposite end projecting outwardly to bear against the under side of the pedal. In addition to acting with torsional effect to raise the pedal, the coils of the spring also exert pressure against the collar 205 to normally hold the polygonal head 200 of the pin in the socket. The projecting end of the pin 153 is squared to receive a key or wrench and by pressing axially against the pin 153 it may then be turned to increase or to diminish the torsional effect of the spring 154 to vary the pressure required to operate the pedal. The thrust of the spring 154 against the collar 205 forces the polygonal head 200 into the socket when pressure on the squared end of the pin 153 is relieved.

Figure 19:
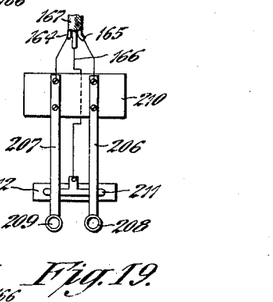
Fig. 19 is a plan view of a hand-operated controlling means for the apparatus.

The finger control, shown in detail in Fig. 19, consists of two contact-arms 206 and 207 constructed from spring metal and provided with finger-pieces or keys 208 and 209 at their extremities. The contact-arms are mounted on an insulation block 210 with the arm 206 connected electrically with the conductor 165 of the cable 167 and the arm 207 joined to the cable conductor 164. The return conductor 166 of the cable 167 is connected to a contact-plate 211 extending beneath both keys and mounted on a strip of insulation 212. When the arm 206 is lowered it contacts with the plate 211 and causes operation of the imprint-member 14 and illumination of the lamp 141; and similarly, when the arm 207 contacts with the plate 211 the space-member 15 is operated in the manner as previously explained.

Figures 20, 21, 22, 23:
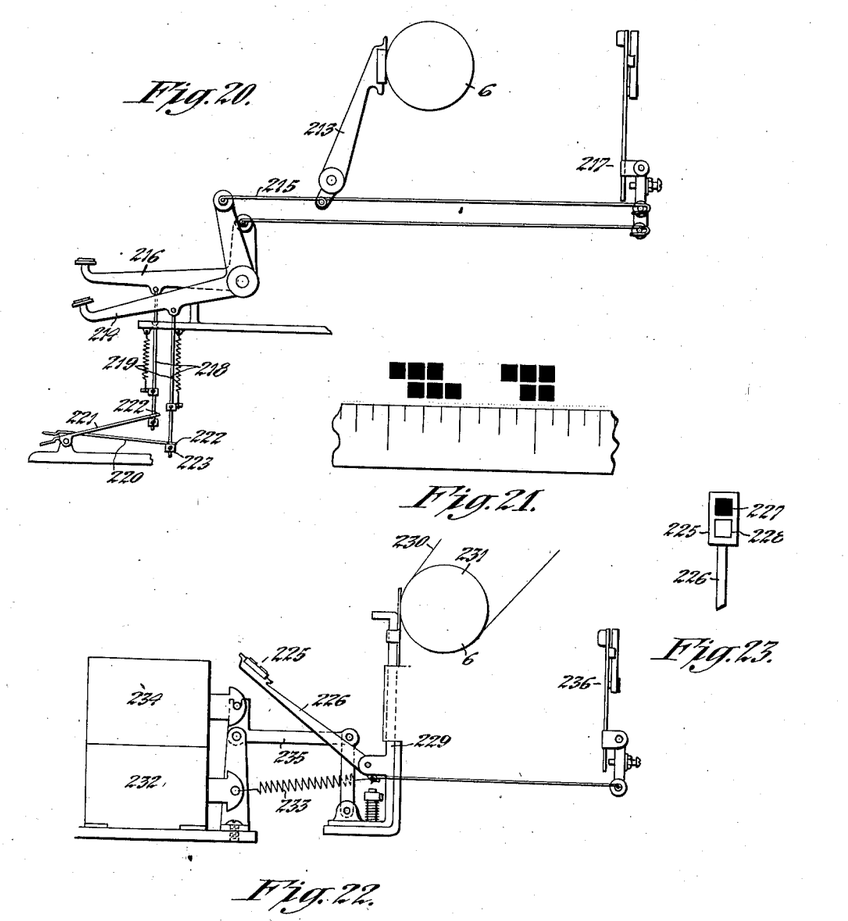
Fig. 20 is an end elevation of an alternative form of controlling means in which the printing characters are mechanically operated.
Fig. 21 is a portion of a printed diagram obtained with the use of the form of device shown in Fig. 20 and illustrating the method of interpreting the record.
Fig. 22 shows a modified form of construction of the apparatus in which only one printing member is employed and actuated by raising and lowering the slide carrying the member.
Fig. 23 is a detail view of the printing or recording member employed in the form of construction shown in Fig. 22.

Modifications in the construction and arrangement of the parts of the apparatus are possible which would fall within the scope of the present invention. For example, a purely mechanical recording apparatus and control could be used, as shown in Fig. 20, wherein a single recording member 213 is operated by a manual key-lever 214 through link connections 215; the key-lever also serving as a means for operating the escapement-mechanism indicated at 217. A second key-lever 216 operates the escapement 217 only. The key-levers 214 and 216 may also be operated by pedals with equal efficiency. From each key-lever depends a wire rod 218. Arranged below the printing device are two pedals 220 and 221 provided at their rearward ends with holes or eyes 222 through which the rods 218 pass. Coil springs 219 fastened to the rods and the frame of the device tend to maintain the pedals elevated. Fastened to each rod below the eye 222 of each pedal is a collar 223 against which the pedal is pressed to effect lowering of the respective key-levers. Pressure upon the pedal 220 actuates the key-lever 214 to cause it to imprint the pattern character and also operates the escapement 217 to feed the carriage. Pressure upon the pedal 221 operates the key-lever 216 to feed the carriage without causing any imprinting action. Due to the fact that no space character is employed with this form of construction the resultant printed cloth design will be composed of colored squares having variably-sized spaces therebetween. To interpret the design a scale having graduations equal to the size of the squares is applied thereto as indicated in Fig. 21, and the "overs" and "unders" may then be readily deduced.

Inasmuch as cloth designs or construction records are often made with but one size of index or pattern character, it is possible to obtain the necessary records with only one magnet connected to operate the recording member and escapement-mechanism. Referring now to Fig. 23, the imprinting portion or head 225 of the recording member 226 carries an index or printing character 227, consisting of a solid printing square, at or near its top and an open or outline square 228 therebelow. The recording member 226 is mounted on the slide 229, shown in Fig. 22. When the slide 229 is at its bottom station the member 226 prints the character 227 upon the blank 230 supported by the roll 231. Action of the member 226 is derived from a solenoid 232 through means of a spring-link 233. A second solenoid 234 is connected with the slide 229 by means of a bell-crank lever 235 whereby when the solenoid 234 is energized it acts to raise the slide. The solenoid 232 is connected with both the member 226 and the escapement-mechanism 236 so that each actuation of the member 226 is accompanied by escapement action and feed of the carriage supporting the roll 231. When the slide 229 is at its bottom station actuation of the member 226 by the solenoid 232 causes imprint of the pattern-character 227 and concurrent feeding of the carriage. On the other hand, raising of the slide 229 under the action of the solenoid 234 causes the member 226 to be simultaneously lifted so that the space designation is printed upon the blank 230. With an apparatus constructed in accordance with the last described form for imprinting characters of but one size provision would not be required for variable feed in either the roll 231 or the carriage upon which the roll is mounted.

It will be observed from the foregoing that the present invention provides a particularly simple yet efficient apparatus for mechanically recording cloth or fabric designs. The apparatus operates with great precision in recording the character of the design upon the paper. With the use of the present apparatus it is possible for one person to analyze and record the construction of the fabric more accurately and expeditiously without necessitating constant observing of the pattern being printed. The apparatus is readily adjusted to adapt it for printing patterns employing different sizes of squares or quadrates. The use of cross-ruled paper is not essential for recording designs since the printing characters employed in the apparatus clearly define the pattern without the use of guide lines. The present invention thus provides an apparatus which is positive in action and durable in use besides being capable of rapid operation with a minimum of attention on the part of the operator.

While I have herein shown and described several preferred forms of construction of the device, by way of example, it is to be understood that other changes might be made in the structure and arrangement of its parts which would fall within the spirit or scope of the invention. Therefore, without limiting myself in this respect, I claim:

1. An apparatus for recording cloth construction in which the record consists of a representation in aligned sequence of the over and under pick relation of the weft to the warp threads of a fabric comprising mechanically-operative recording means having separate characters indicating each of said pick relations, and means for operating said characters to form the record.

2. An apparatus for recording cloth construction in which the record consists of a representation in aligned sequence of the over and under pick relation of the weft to the warp threads of a fabric comprising recording means having separate characters indicating each of said pick relations, electromagnetic means for operating said characters to form the record, and circuit-breakers for selectively controlling the electromagnetic operating means.

3. An apparatus for recording cloth construction in which the record consists of a representation in aligned sequence of the over and under pick relation of the weft to the warp threads of a fabric comprising mechanically-operative recording means having separate characters indicating each of said pick relations, and pedally-operated means for selectively operating the separate characters to form the record.

4. An apparatus for recording cloth construction in which the record consists of a representation in aligned sequence of the over and under pick relation of the weft to the warp threads of a fabric comprising recording means having separate characters indicating each of said pick relations, electromagnetic means for operating said separate characters of the recording means, and pedally-operated circuit-breakers for controlling the electromagnetic means to selectively operate the separate characters to form the record.

5. An apparatus for recording cloth construction in which the record consists of a representation in aligned sequence of the over and under pick relation of the weft to the warp threads of a fabric comprising mechanically-operative recording means having separate characters indicating each of said pick relations, one of said characters being adapted to imprint a colored quadrate and the other of said characters adapted to imprint a quadrate outline, and means for operating said characters to form the record.

6. The method of recording cloth construction on a record blank by marking adjacent aligned quadrates to indicate the over and under pick relation of the weft to the warp threads in a fabric which comprises feeding a record blank to present quadrated areas at an imprinting station in aligned sequence, mechanically imprinting a character in certain of the quadrated areas at the imprinting station to indicate an over or under pick relation, and selectively controlling the feeding of the record blank and the imprinting of the character with the feet to permit the fabric to be examined in the hands.

GILBERT BELL.